United States Patent
Dillon

[19]

[11] Patent Number: 6,089,477
[45] Date of Patent: Jul. 18, 2000

[54] BACKPACK SPREADER

[76] Inventor: Patrick Dillon, 172 River Dr., Lake Hiawatha, N.J. 07034

[21] Appl. No.: 09/225,239

[22] Filed: Jan. 4, 1999

[51] Int. Cl.[7] .......................... A01C 15/00; A01C 17/00; A62C 15/00
[52] U.S. Cl. .......................... 239/653; 239/683; 239/153
[58] Field of Search .................................. 222/175, 366, 222/333, 527; 239/214, 680, 672, 152–154, 142, 653, 688, 683, 689, 684; 366/316, 317, 325.92, 342, 343

[56] References Cited

U.S. PATENT DOCUMENTS

| | | |
|---|---|---|
| 27,273 | 2/1860 | Copeland . |
| 425,338 | 4/1890 | Muller . |
| 935,734 | 10/1909 | Bessen . |
| 1,314,546 | 9/1919 | Stratton . |
| 2,192,256 | 3/1940 | Brandt ..................................... 222/175 |
| 2,892,286 | 6/1959 | Martin ..................................... 222/175 |
| 3,096,984 | 7/1963 | Garrison . |
| 3,157,402 | 11/1964 | Love, Jr. . |
| 3,603,482 | 9/1971 | Shelton ................................... 222/175 |
| 3,993,225 | 11/1976 | Manni ..................................... 222/324 |
| 4,998,674 | 3/1991 | Torra ....................................... 239/652 |
| 5,339,994 | 8/1994 | Nuila ....................................... 222/175 |
| 5,409,166 | 4/1995 | Gunzel, Jr. et al. .................... 239/142 |
| 5,429,278 | 7/1995 | Sansalone ............................... 222/333 |
| 5,447,272 | 9/1995 | Ask ............................................. 239/7 |
| 5,630,537 | 5/1997 | Sciacca ................................... 224/629 |

*Primary Examiner*—Andres Kashnikow
*Assistant Examiner*—Davis Hwu
*Attorney, Agent, or Firm*—Terrance L. Siemens

[57] ABSTRACT

A backpack spreader comprising a hopper having an outlet port. The hopper holds chemical materials therein. A mounting means is for mounting the hopper on a back of a person. A flexible feed tube has a first end connected to the outlet port of the hopper. A dispensing gun is connected to a second end of the flexible feed tube. The dispensing gun held and operated by a hand of the person will evenly spread the chemical materials over large areas.

2 Claims, 4 Drawing Sheets

BACKPACK SPREADER

BACKGROUND OF THE INVENTION

1. Field of the Invention

The present invention relates generally to particle dispenser devices. More particularly, the invention comprises a backpack spreader.

In general, a first field of use of the disclosed invention is by homeowners as the most likely benefactors of the unique advantages of the instant invention. However, many other fields, such as industrial building maintenance personal, could find potentially beneficial uses of this invention.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is, therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

2. Description of the Prior Art

Attempts have been made in the prior art to devise particle dispenser devices. These particle dispenser devices are used to distribute the particles therefrom. Some of the particle dispenser devices are carried or worn by a user, thereby allowing the user to both operate and move the particle dispenser devices about.

Particle dispenser devices are shown in U.S. Pat. No. 27,273, issued to George Copeland on Feb. 28, 1860, No. 425,338, issued to George Muller on Apr. 8, 1890, No. 935,734, issued to Henry Bessen on Oct. 5, 1909, No. 1,314,546, issued to Charles D. Stratton on Sep. 2, 1919, No. 3,096,984, issued to Marvin L. Garrison on Jul. 9, 1963, No. 3,157,402, issued to William D. Love, Jr. on Nov. 17, 1964, No. 3,993,225, issued to Mario Manni on Nov. 23, 1976, No. 4,998,674, issued to Alessandro Torra on Mar. 12, 1991 and No. 5,447,272, issued to Bernard J. Ask on Sep. 5, 1995.

U.S. Pat. No. 27,273 to Copeland discloses a broadcast seeder. The broadcast seeder is a simple portable and economical implement that may be carried by an operator and manipulated with the greatest facility in order to sow seed broadcast in a more even manner than can be done direct by hand. The present invention is completely different than this patent, in that it consists of a hopper worn on the back of a user and connected via a flexible feed tube to a dispensing gun for evenly spreading chemical materials over large areas.

U.S. Pat. No. 425,338 to Muller discloses a distributer for flock, sand, tinsel, etc. The apparatus is adapted to distribute flock, sand, tinsel, seeds, fertilizer material and the like onto a surface by means of a current of air. The present invention is completely different than this patent, in that it consists of a hopper worn on the back of a user and connected via a flexible feed tube to a dispensing gun for evenly spreading chemical materials over large areas.

U.S. Pat. No. 935,734 to Bessen discloses a seeder. The seeder provides a simple, durable and inexpensive means for adjusting the feed from a hopper, for agitating the seed within the hopper and means for oscillating a centrifugal discharging spout. The present invention is completely different than this patent, in that it consists of a hopper worn on the back of a user and connected via a flexible feed tube to a dispensing gun for evenly spreading chemical materials over large areas.

U.S. Pat. No. 1,314,546 to Stratton discloses a fertilizer distributer. The device may be quickly and conveniently manipulated, which will at each operation discharge a predetermined quantity of fertilizer. The present invention is completely different than this patent, in that it consists of a hopper worn on the back of a user and connected via a flexible feed tube to a dispensing gun for evenly spreading chemical materials over large areas.

U.S. Pat. No. 3,096,984 to Garrison discloses a spreader. A shielded impeller is provided in the spreader, so as to protect the operator, to preclude damage to the impeller and to control distribution incident to spreading. The present invention is completely different than this patent, in that it consists of a hopper worn on the back of a user and connected via a flexible feed tube to a dispensing gun for evenly spreading chemical materials over large areas.

U.S. Pat. No. 3,157,402 to Love, Jr. discloses a material spreading and broadcasting device. The device is a lightweight and conveniently sized unit which is designed for easy handling and directing of the material being broadcast over lawns or other garden areas to be covered. The present invention is completely different than this patent, in that it consists of a hopper worn on the back of a user and connected via a flexible feed tube to a dispensing gun for evenly spreading chemical materials over large areas.

U.S. Pat. No. 3,993,225 to Manni discloses a portable spreader for particulate material. The spreader is a completely portable hand-operated unit, whereby an operator may carry the entire unit to the area to which the particulate material is to be distributed, and readily and evenly distribute the material over the desired area. The present invention is completely different than this patent, in that it consists of a hopper worn on the back of a user and connected via a flexible feed tube to a dispensing gun for evenly spreading chemical materials over large areas.

U.S. Pat. No. 4,998,674 to Torra discloses a fluent granular material dispenser and applicator. The dispenser and applicator may be quickly used to spread traction assisting granular materials beneath and forward of driving wheels of a vehicle on an icy road surface. The present invention is completely different than this patent, in that it consists of a hopper worn on the back of a user and connected via a flexible feed tube to a dispensing gun for evenly spreading chemical materials over large areas.

U.S. Pat. No. 5,447,272 to Ask discloses an automatic deicer spreader. The spreader will detect freezing conditions and automatically apply any deicing agent or traction improving agent to a targeted surface in wet and/or freezing conditions. The present invention is completely different than this patent, in that it consists of a hopper worn on the back of a user and connected via a flexible feed tube to a dispensing gun for evenly spreading chemical materials over large areas.

None of the above inventions and patents, taken either singly or in combination, is seen to describe the instant invention as claimed.

SUMMARY OF THE INVENTION

The present invention is a backpack spreader that consists of a hopper worn on the back of a user and is connected by a flexible feed tube to a dispensing gun for evenly spreading chemical materials over large areas.

Accordingly, it is a principal object of the invention to provide a backpack spreader that will overcome the shortcomings of the prior art devices.

Another object of the invention is to provide a backpack spreader that can perform the usually time consuming job of evenly spreading chemical materials over large areas in quick time, thus enabling a user to spread the materials much more efficiently.

An additional object of the invention is to provide a backpack spreader that will allow industrial building maintenance personal using this device to greatly reduce their yearly salting maintenance budgets.

A further object of the invention is to provide a backpack spreader that is simple and easy to use.

A still further object of the invention is to provide a backpack spreader that is economical to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
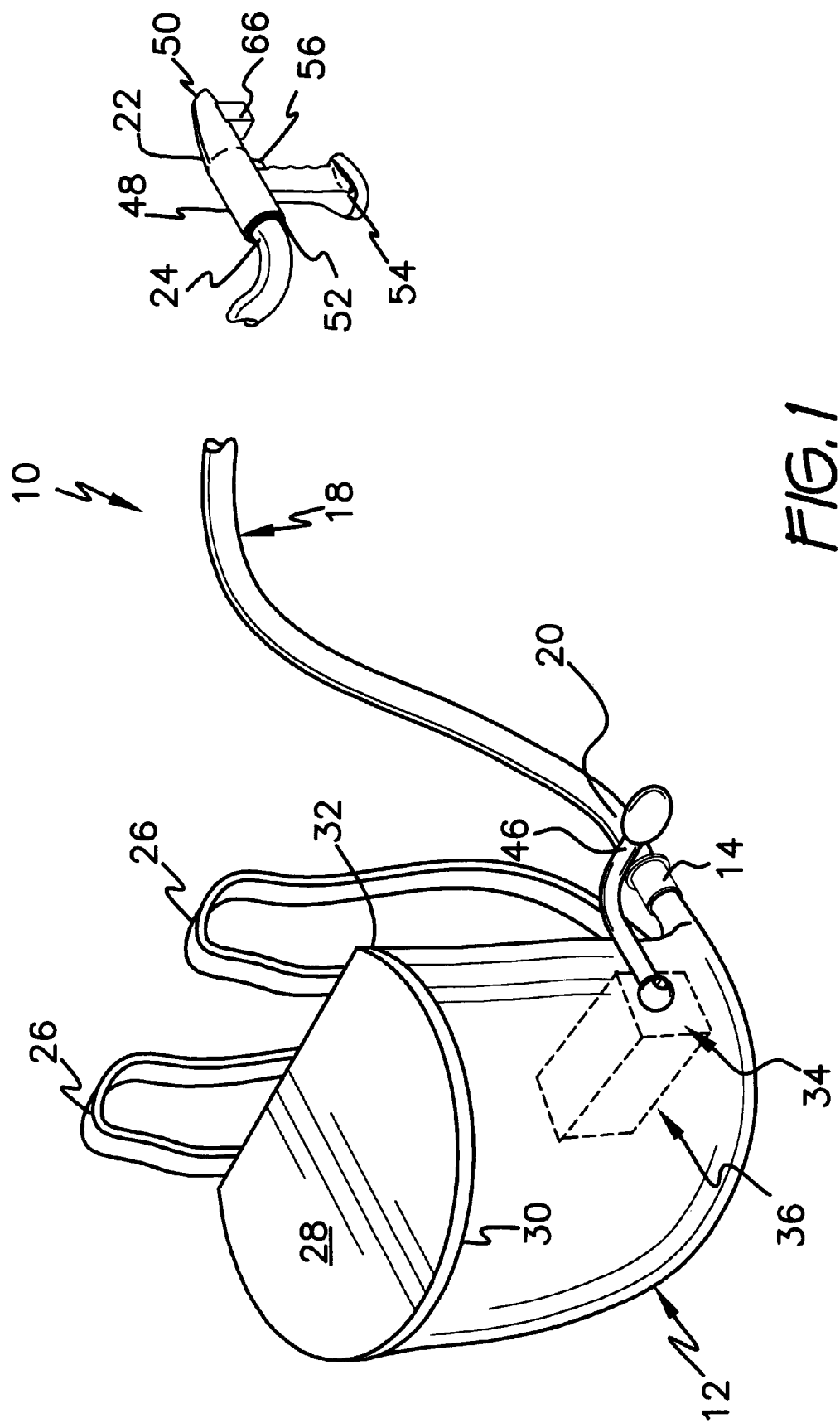
FIG. 1 is a perspective view of the present invention.

Turning now descriptively to the drawings, in which similar reference characters denote similar elements throughout the several views, FIGS. 1 through 4 illustrate the various components of the present invention being a backpack spreader 10 comprising a hopper 12 having an outlet port 14. The hopper 12 holds chemical materials, such as snow/ice melt pellets, calcium chloride, etc., therein. A mounting means 16 is for mounting hopper 12 on a back of a person. A flexible feed tube 18 has a first end 20 connected to outlet port 14 of hopper 12. A dispensing gun 22 is connected to a second end 24 of flexible feed tube 18. Dispensing gun 22 held and operated by a hand of the person will evenly spread the chemical materials over large areas.

Mounting means 16 consists of a pair of shoulder straps 26 affixed to hopper 12. A cover 28 is hinged to open top 30 of hopper 12. Slide fastener 32 is located between cover 28 and open top 30 of hopper 12.

Hopper 12 further includes an agitation means 34 for agitating the chemical materials therein, so as to keep the chemical materials from sticking together. Agitation means 34 is a main double ratchet assembly 36 mounted within hopper 12 adjacent outlet port 14.

Figure 4:
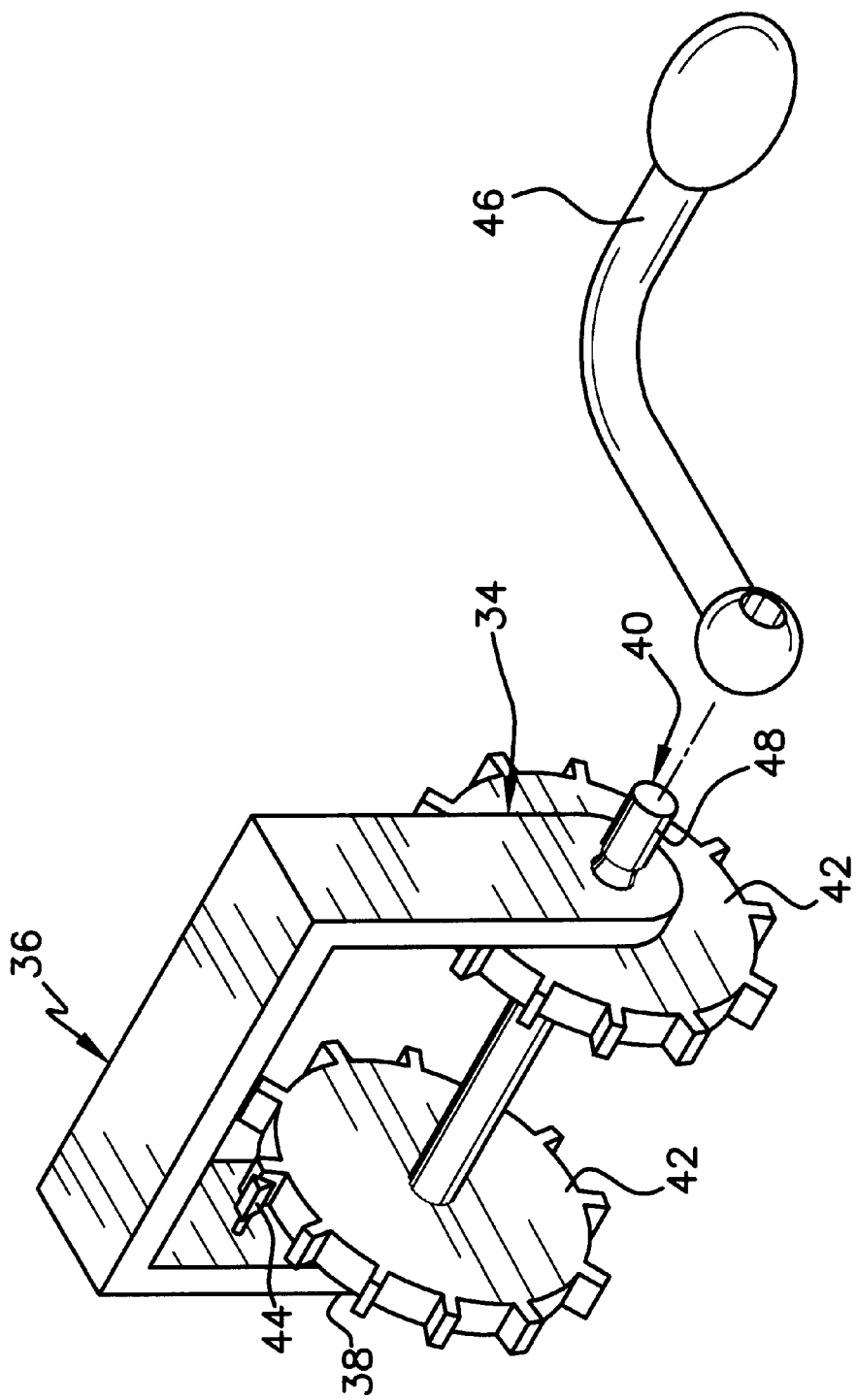
FIG. 4 is an enlarged perspective view of the main double ratchet assembly as indicated by area of arrow 4 in FIG. 1.

Main double ratchet assembly 36, as best seen in FIG. 4, contains an inverted U-shaped frame member 38. An axle 40 is carried in frame member 38. A pair of ratchets 42 are spaced apart and mounted on axle 40. Spring biased pawl mounted on frame member 38 is in engagement with one of the ratchets 42. Ratchet handle 46 is attached to one end 48 of axle 44 extending outwardly from hopper 12, so that an elbow of the person can engage ratchet handle 46 to manually rotate ratchets 42 and operate main double ratchet assembly 36.

Figure 2:
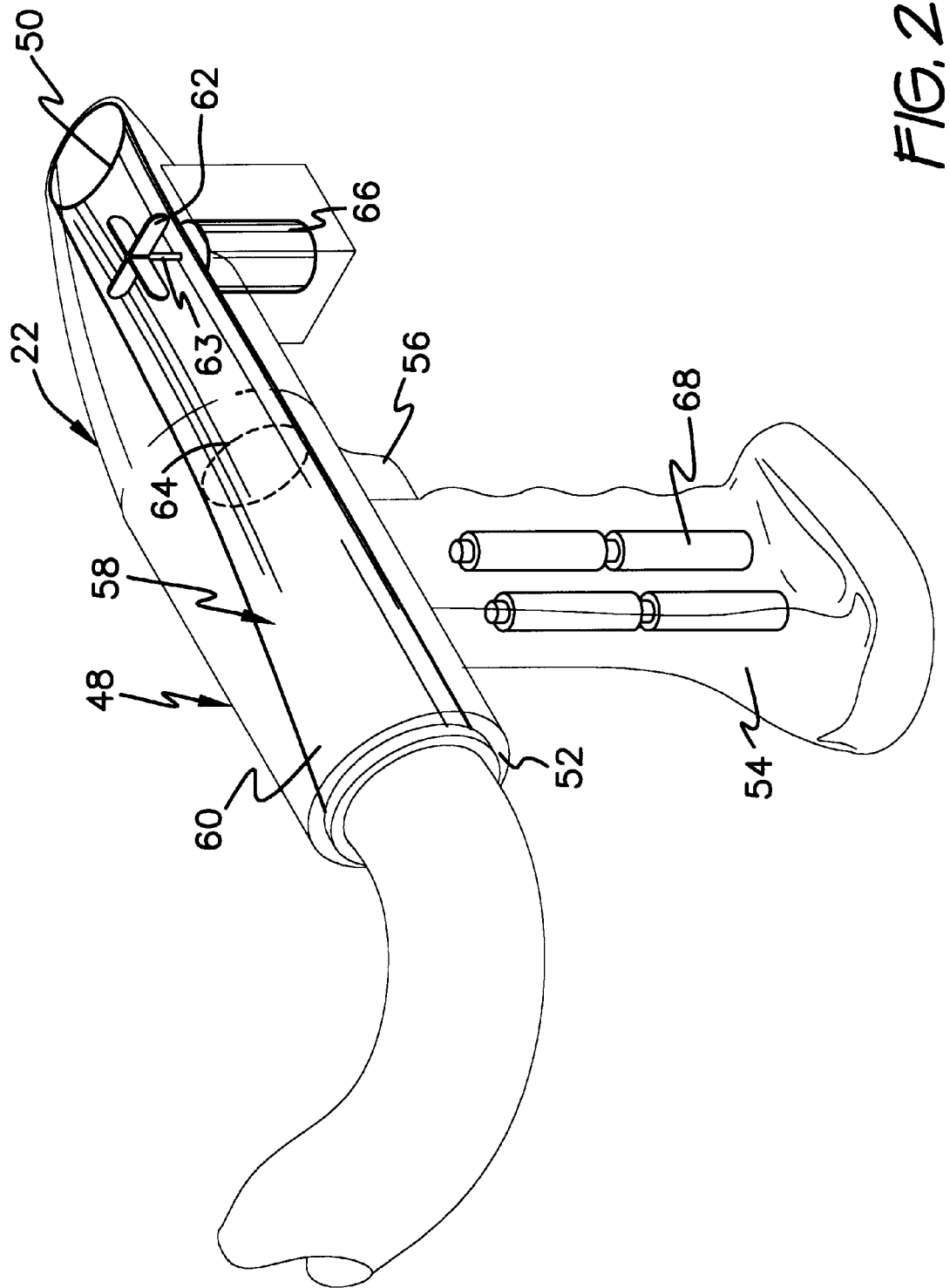
FIG. 2 is an enlarged diagrammatic perspective view partly in cross section of the dispensing gun as indicated by area of arrow 2 in FIG. 1.
Figure 3:
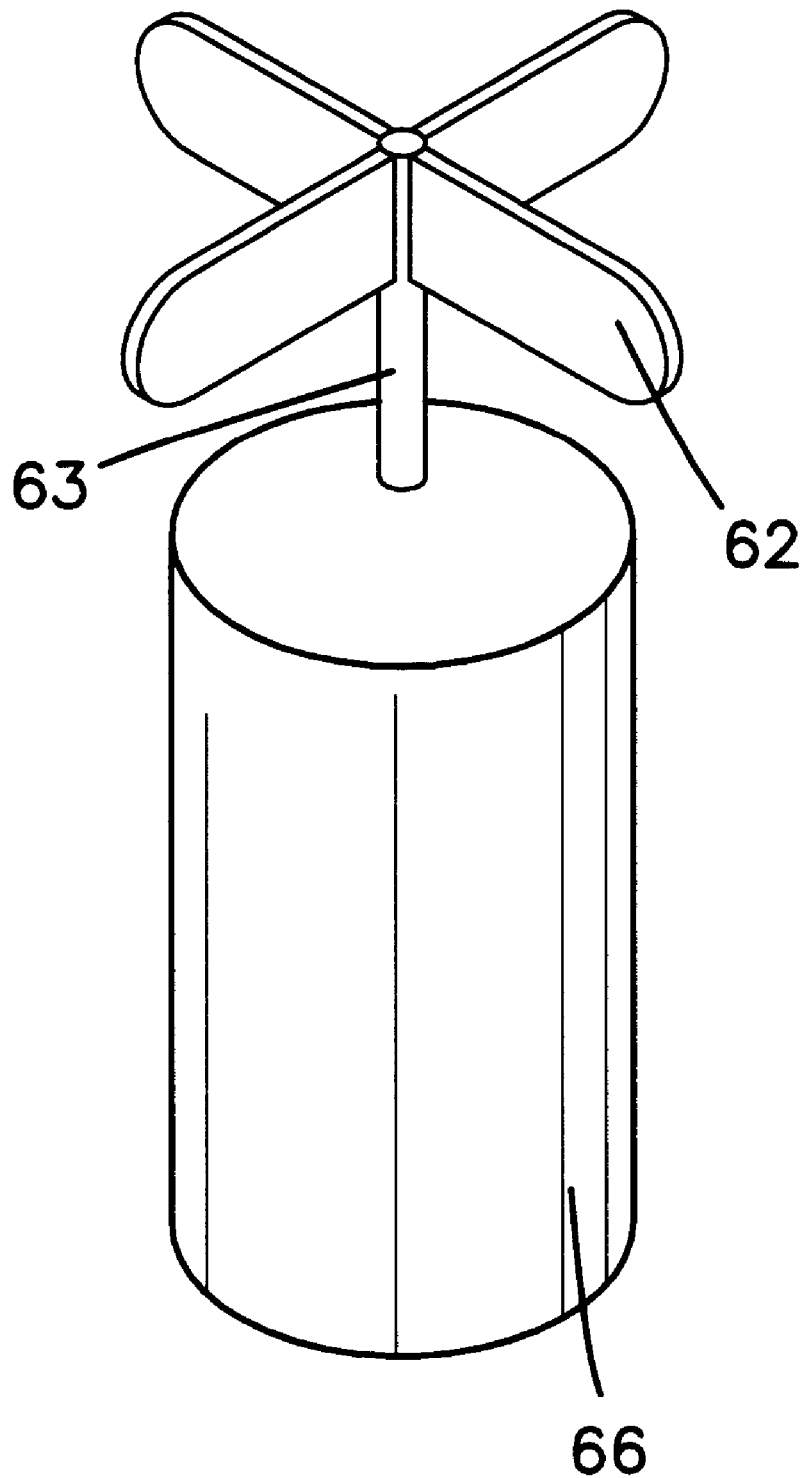
FIG. 3 is a further enlarged perspective view of the motor and impeller of the dispensing gun.

Dispensing gun 22, as best seen in FIG. 2, includes a barrel 48 having a front nozzle 50 and an open back end 52 connected to second end 24 of flexible feed tube 18. Hollow grip handle 54 is integrally connected to barrel 48. Trigger switch 56 is on hollow grip handle 54 adjacent barrel 48.

Dispensing gun 22 further contains a feed funnel 58 within barrel 48. Wide end 60 of feed funnel 58 is connected to open back end 52 of barrel 48, to guide the chemical materials through barrel 48. An impeller 62 is rotatively mounted within barrel 48 between narrow end 64 of feed funnel 58 and front nozzle 50 of barrel 48. Drive motor 66 has a drive shaft 68 to operate impeller 62 (see FIG. 3). A plurality of batteries 68 carried within hollow grip handle 54 are electrically connected between trigger switch 56 and drive motor 66. When a finger on a hand of the person holding hollow grip handle 54 squeezes trigger switch 56, impeller 62 will rotate to expel the chemical materials out through front nozzle 50.

It is to be understood that the present invention is not limited to the embodiments described above, but encompasses any and all embodiments within the scope of the following claims.

I claim:

1. A backpack spreader comprising:
   a hopper having an outlet port, said hopper holds chemical materials therein;
      wherein said hopper further includes an agitation means for agitating the chemical materials therein, so as to keep the chemical materials from sticking together, and wherein said agitation means is a main double ratchet assembly mounted within said hopper adjacent said outlet port;
   mounting means for mounting said hopper on a back of a person;
   a flexible feed tube having a first end connected to said outlet port of said hopper; and
   a dispensing gun connected to a second end of said flexible feed tube, whereby said dispensing gun held and operated by a hand of the person will evenly spread the chemical materials over large areas.

2. The backpack spreader as recited in claim 1, wherein said main double ratchet assembly includes:
   an inverted U-shaped frame member;
   an axle carried in said frame member;
   a pair of ratchets spaced apart and mounted on said axle;
   a spring biased pawl mounted on said frame member and in engagement with one of said ratchets; and
   a ratchet handle attached to one end of said axle extending outwardly from said hopper, so that an elbow of the person can engage said ratchet handle to manually rotate said ratchets and operate said main double ratchet assembly.

* * * * *